United States Patent [19]
White

[11] Patent Number: 4,650,087
[45] Date of Patent: Mar. 17, 1987

[54] ANTI-SIPHONING DEVICE
[75] Inventor: Leo White, Coshocton, Ohio
[73] Assignee: Yankee Wire Cloth Products, Inc., West Lafayette, Ohio
[21] Appl. No.: 760,122
[22] Filed: Jul. 29, 1985
[51] Int. Cl.$^4$ ............................................. B65D 51/18
[52] U.S. Cl. ............................................. 220/86 AT
[58] Field of Search .............. 220/86 AT, 85 F, 88 A, 220/90.4; 138/40, 41, 42, 89

[56] References Cited
U.S. PATENT DOCUMENTS

| | | | |
|---|---|---|---|
| 1,808,245 | 6/1931 | Middleton | 220/86 AT |
| 1,994,421 | 3/1935 | Roberts | 220/86 AT |
| 2,107,600 | 2/1938 | Darms | 220/86 AT |
| 2,145,758 | 1/1939 | Fellows et al. | 220/86 AT |
| 2,313,266 | 3/1943 | Roberts | 220/86 AT |
| 2,421,350 | 5/1947 | Odell | 220/86 AT |
| 2,737,205 | 3/1956 | Stringfield | 138/89 |
| 3,363,616 | 1/1968 | Baumgarten | 138/41 X |
| 3,578,027 | 5/1971 | Zopfi | 138/89 |
| 4,529,097 | 7/1985 | Larson | 138/40 X |

FOREIGN PATENT DOCUMENTS 461298 1/1951 Italy .
471488 5/1952 Italy .
739386 10/1955 United Kingdom .

Primary Examiner—Steven M. Pollard
Attorney, Agent, or Firm—Watts, Hoffmann, Fisher and Heinke Co.

[57] ABSTRACT

An anti-siphoning device that can be installed without special tools and/or modification to a storage tank inlet. A cylindrical insert has holes in a bottom and side that allow liquid to pass to a storage tank while preventing the insertion of a siphoning hose into the tank. The insert has rings affixed to an outer wall that frictionally engage inner walls of the tank inlet to prevent withdrawal of the insert.

3 Claims, 3 Drawing Figures

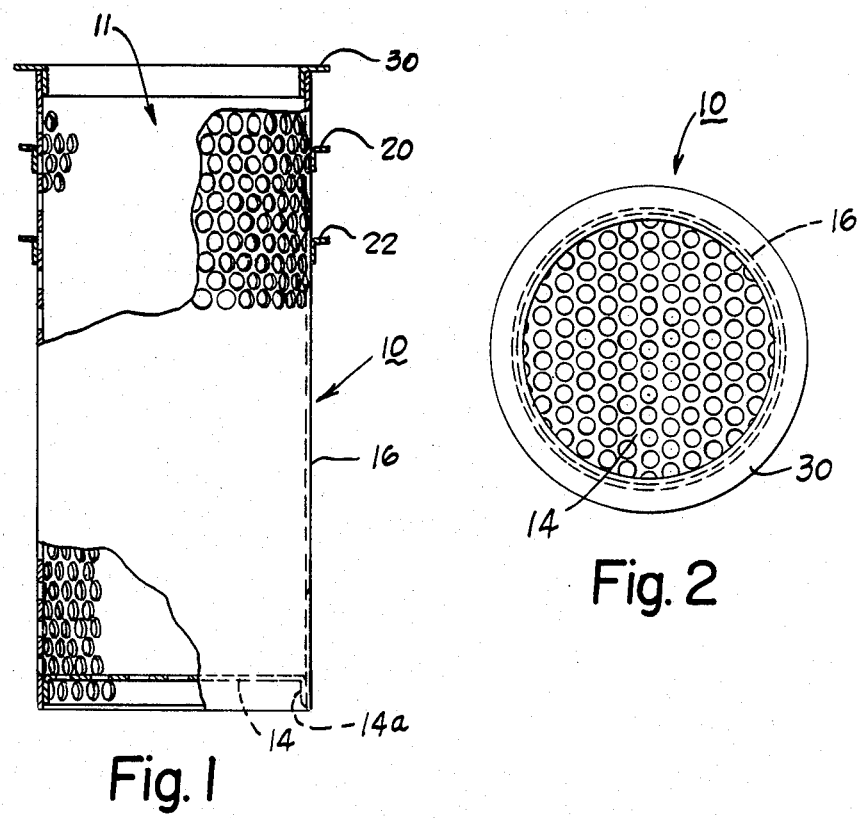
Fig. 1
Fig. 2
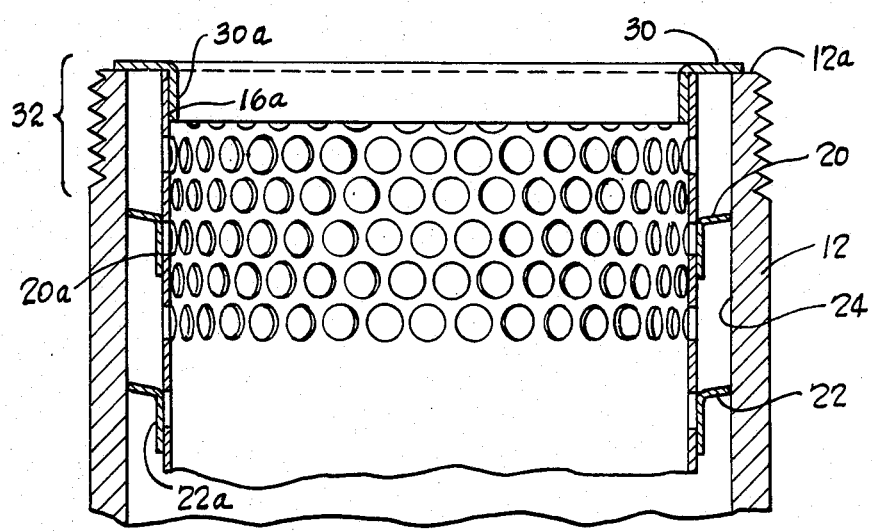
Fig. 3

4,650,087

ANTI-SIPHONING DEVICE

TECHNICAL FIELD

The present invention relates to an anti-siphoning device for a storage tank containing a liquid.

BACKGROUND ART

Prior art patents disclose anti-siphoning devices for preventing unauthorized removal of liquid from a storage tank. One method of preventing siphoning is to partially block access to the storage tank so that the tank can be filled but a siphoning hose may not be inserted into the tank to siphon away liquid.

A typical prior art method for blocking the tank inlet is to mount an insert near the inlet that allows a fuel dispensing device to be inserted into the inlet but prevents insertion of a siphoning hose.

Italian Pat. No. 461,298 to Stratta illustrates one such anti-siphoning device. This patent discloses a cylindrical receptacle connected to a fuel tank inlet. The receptacle bottom has small holes that allow liquid to pass to the tank, but which prevent an extraction tube from being inserted in the tank. Exensions formed in the side of the receptacle engage a flange formed in the tank inlet to prevent withdrawal of the anti-siphoning device.

The prior art anit-siphoning devices such as the apparatus disclosed in the Stratta Patent require modification of the tank inlet to accommodate the anti-siphoning devices. The Stratta tank inlet must include a flange that prevents withdrawl of the anti-siphoning device from the inlet. An additional drawback in these devices is that many can only be installed with special tools for disassembling or modifying structure on either the tank inlet or the anti-siphoning device. The Stratta Patent refers, for example, to the use of rivets or pins to hold the insert in place. Applicant is unaware of a truly easy-to-install yet effective anti-siphoning device for an existing liquid storage tank.

DISCLOSURE OF THE INVENTION

The present invention addresses the aforementioned weaknesses of the prior art. An insert constructed in accordance with the invention is installed without special tools and requires no modification of the storage tank inlet.

The insert includes structure that defines the extent to which a liquid dispensing implement can be inserted into a storage tank inlet. The insert impedes insertion of a siphoning device, such as a hose or the like, into the tank. The insert is thrust into a tank opening or inlet and one or more rings extending from an outer wall of the insert engage an inner wall of the tank inlet. The rings flex slightly as the insert is installed and resist removal of the insert from the tank inlet.

A lip or flange having a diameter slightly larger than the rings engages the tank inlet to define a limit of travel for the insert as it is installed. The user simply inserts the insert into the tank inlet and drives the insert into the inlet until the lip engages an outermost portion of the inlet. In this position, the insert impedes insertion of a siphoning device beyond the extent of the insert, yet allows a liquid dispensing spout to be inserted a distance sufficient to fill the tank.

One object of the invention is an anti-siphoning device which can be easily installed in a conventional storage tank to prevent unauthorized removal of liquid stored in the tank. Other objects, advantages and features of the invention will become better understood when a detailed description of a preferred embodiment of the invention is described in conjuntion with the accompanying drawing.

BRIEF DESCRIPTION OF THE DRAWING

FIG. 1 is a partially sectioned view of a anti-siphoning device constructed in accordance with the invention;

FIG. 2 is top plan view of the FIG. 1 device; and

FIG. 3 is an enlarged sectioned view of a portion of the device inserted into a tank inlet.

BEST MODE FOR CARRYING OUT THE INVENTION

Turning now to the drawings, FIG. 1 illustrates an anti-siphoning device 10 for preventing unauthorized withdrawal of liquid from a storage tank. The insert 10 defines an enclosure having an opening 11 at one end to allow a liquid dispensing spout to be inserted within the insert 10 after it has been mounted in a tank neck 12 (FIG. 3). As seen in the figures, the insert 10 is generally cylindrical in shape. A bottom 14 and cylindrical wall 16 include a number of regularly spaced apertures to allow fuel to pass from the inlet through the tank neck to the storage tank. The apertures or holes are of such a small diameter that a siphoning hose or the like can not be inserted beyond the insert bottom 14 and therefore unauthorized siphoning of the fuel in the tank is prevented.

The enlarged view of FIG. 3 shows additional details regarding the construction of the insert 10. Two circumferentially encompassing rings 20, 22 are permanently affixed to the outer wall of the insert and are of a diameter such that when the insert 10 is thrust into the tank neck 12, these rings frictionally engage an inner wall surface 24. As shown in FIG. 3, the two rings 20, 22 flex or bend slightly as the insert 10 is thrust into the tank neck 12. The slightly deformed rings 20, 22 impede withdrawal of the insert 10 from the neck 12. The insert 10 also includes a lip or flange 30 that engages the outer end face 12a of the neck 12 to limit how far the insert 10 can be pushed into the neck 12. The flange 30 has a circumference greater than the rings 20, 22 but less than an outer circumference of the neck 12 so that a threaded neck portion 32 is unobstructed.

The cylindrical wall 16 is constructed from a flat rectangular piece of sheet steel having apertures spaced in a regular matrix fashion as shown in the drawings. The rectangular metal sheet is bent into a cylinder and conforming edges are secured together by brazing or welding. The disc-like bottom 14, also having a matrix array of apertures, includes a lip 14a to facilitate brazing of the bottom 14 to the closed cylinder 16.

The two ring elements 20, 22 are positioned about the outer surface of the cylinder 16 and brazed or welded in place. Each ring 20, 22 includes a cylindrical flange 20a, 22a that is secured to the cylinder 16.

The flange 30 that engages the top surface 12a of the tank inlet is also brazed or welded to the cylinder. The flange 30 defines a cylindrical extension 30a having an outwardly facing surface which engages an inner surface 16a of the cylinder 16.

To insert the device 10 into the tank 12, the user places the insert into the tank neck until a first ring 22 engages the tank neck. From then on, continued movement of the insert requires that the lip 30 be struck with a hammer or other force applying implement to drive the rings 20, 22 into the neck 12. When the lip 30 engages the outer surface 12a of the neck, the device is installed and due to the frictional engagement of the rings 20, 22 about the inner surface 24 of the neck 12, cannot be withdrawn. A liquid dispensing spout can be inserted into the device 10 until it engages the bottom 14 to allow the tank to be filled. A siphoning device such as a hose or the like, can only be inserted until it reaches the bottom 14. The diameter of the apertures in the cylinder 16 and bottom 14 is such that any hose small enough to fit through one of those apertures would necessitate an extremely long wait before a significant amount of liquid could be siphoned away.

The frictional engagement between the insert 10 and the tank neck 12 keeps the insert securely in place. This secure arrangement is achieved without special tools and does not require the tank inlet or neck 12 to be modified to accommodate the insert 10.

The present invention has been described with a degree of particularity. The disclosed device is particularly useful for preventing siphoning of fuel from a vehicle's fuel storage tank but can be used to safeguard any liquid stored in a tank. It is the intent that the invention include all modifications and/or alterations from the disclosed design following within the spirit or scope of the appended claims.

I claim:

1. An anti-siphoning device adapted to be inserted into the inlet neck of a tank comprising a cylindrical member having a side wall, an end wall and an open end, metallic locking means extending radially outward from said side wall uninterrupted around the entire circumference of said side wall to frictionally engage an inside surface of said inlet neck, said metallic locking means having an outer dimension slightly larger than the inside surface of said inlet neck whereby said member can be driven into said inlet neck and the frictional engagement between said locking means and the inside surface of said inlet neck prevents withdrawal of said member, stop means at the open end of said member, said stop means being engagable with an outer end face of said inlet neck to limit inward longitudinal movement of said member when it is driven into the inlet, and said member having multiple apertures for permitting liquid dispensed into the open end of said member to flow into the tank.

2. An anti-siphoning device as claimed in claim 1 wherein the locking means comprises a ring and the outer diameter of said ring is slightly larger than the inside diameter of a circular inlet neck to allow said ring to flex as said member is driven into said inlet neck.

3. An anti-siphoning device comprising:
   a cylindrical metal sleeve defining a matrix of apertures to allow fuel to pass through the sleeve to a fuel tank;
   a metallic disk attached to the sleeve to enclose one end of said sleeve and having a matrix of apertures to allow fuel to pass through the disk to a fuel tank;
   one or more metallic rings attached to the sleeve extending radially outward from an outer sleeve surface to span a distance slightly greater than an inner diameter of an inner wall surface of a fuel tank inlet to frictionally engage said inner wall surface; and
   a metallic flange element attached to the sleeve at an open sleeve end, said flange extending radially outward from the sleeve further than the one or more rings to contact a tank inlet neck and limit an extent to which the device can be inserted into the inlet.

* * * * *